United States Patent [19]

Shanklin

[11] 3,830,398
[45] Aug. 20, 1974

[54] PRESSURE RELIEF RADIATOR CAP

[75] Inventor: Donald J. Shanklin, Granada Hills, Calif.

[73] Assignee: Orion Industries, Inc., Los Angeles, Calif.

[22] Filed: Nov. 29, 1972

[21] Appl. No.: 310,259

[52] U.S. Cl............................ 220/40 S, 220/44 R
[51] Int. Cl...................... B65d 41/06, B65d 51/16
[58] Field of Search............... 220/44 R, 24 C, 40 S

[56] References Cited
UNITED STATES PATENTS

| 2,918,191 | 12/1959 | Pipes et al. | 220/40 S |
| 3,338,455 | 8/1967 | Miller | 220/40 S |
| 3,373,894 | 3/1968 | Johnson | 220/44 R |
| 3,434,621 | 3/1969 | Preuite | 220/44 R |

Primary Examiner—William I. Price
Assistant Examiner—Allan N. Shoap
Attorney, Agent, or Firm—Fulwider, Patton, Bieber, Lee & Utecht

[57] ABSTRACT

A pressure relief radiator cap having a lever pivotable about a horizontal axis to a downward position to slide the depending toe of a sliding pawl into locking registry with one of the usual radiator filler neck flange recesses, and constrain the cap against removal. The lever is upwardly pivotable to slide the depending toe out of such registry to permit removal of the cap, but such upward movement contemporaneously operates valve means of the cap to vent radiator pressure, whereby dangerous pressures are automatically released before one can attempt to rotate the cap for removal.

9 Claims, 6 Drawing Figures

PATENTED AUG 20 1974 3,830,398
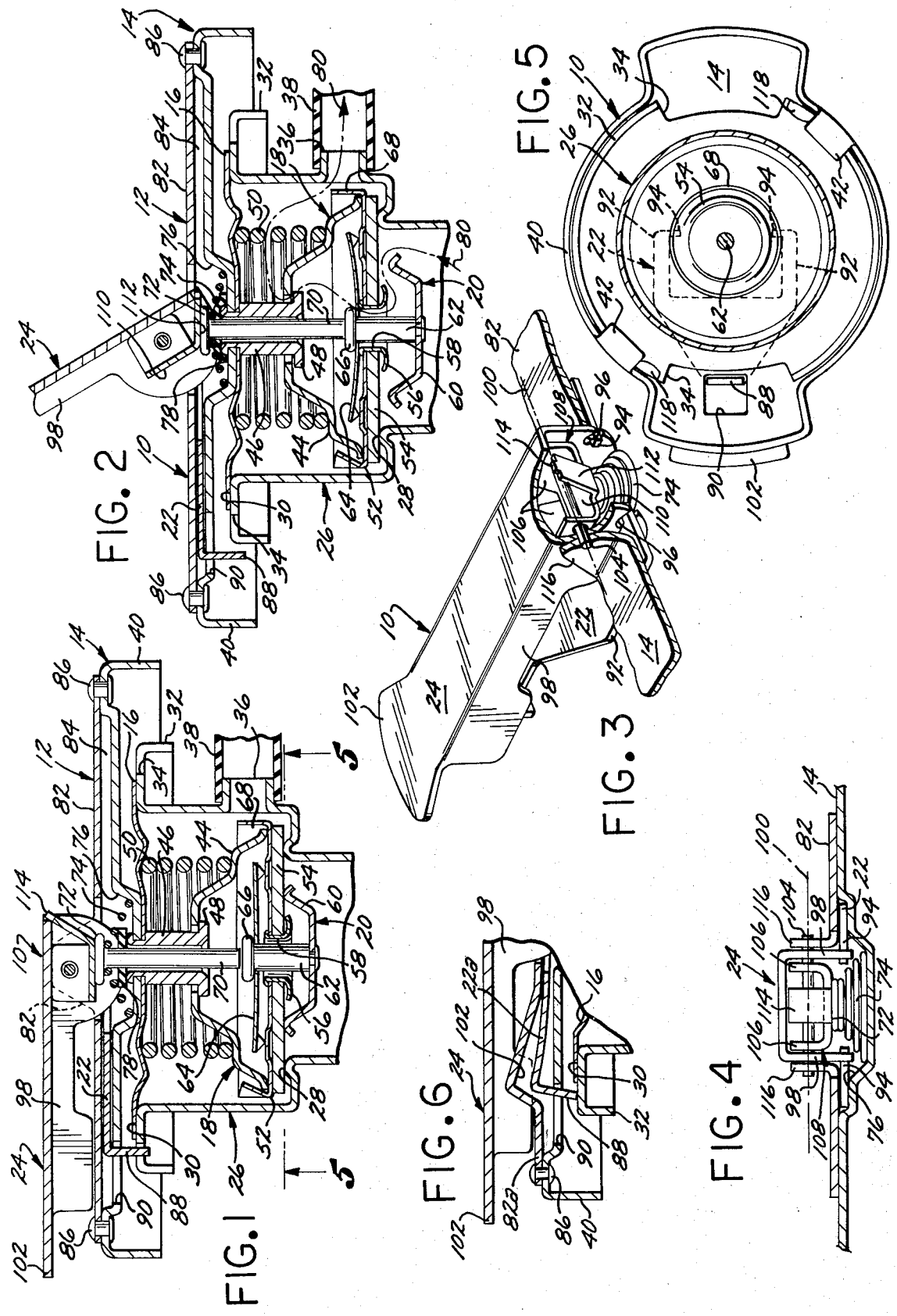

PRESSURE RELIEF RADIATOR CAP

BACKGROUND OF THE INVENTION

1. Field of the Invention

The present invention relates to pressure relief radiator caps, and particularly to such caps incorporating means for venting radiator pressures automatically when attempts are made to remove the caps.

2. Description of the Prior Art

Gasoline station attendants and individual vehicle owners are exposed to scalding steam and water when they inadvertently remove the radiator caps of overheated vehicle engines. Many engine cooling systems are pressurized so that this hazard is presented in such instances even under normal engine operating temperatures.

Various radiator caps have been devised which are intended to automatically vent radiator pressures through the radiator overflow pipe whenever the caps are removed. Some are relatively expensive, others are not fool-proof in operation, and still others are awkward to use, present sharp, possibly injurious protrusions, or prematurely fail to function properly.

SUMMARY OF THE INVENTION

According to the present invention, a pressure relief radiator cap is provided which is particularly adapted for use with an automobile radiator filler neck of the type which has an internal lower seat, an upper seat, an overflow vent between the seats, and a flange at the top of the filler neck provided with a pair of opposed recesses.

The present cap includes locking fingers which are adapted to drop through the filler neck flange recesses so that the cap can be rotated onto the filler neck. In addition, the cap includes vertically spaced valve assemblies which are adapted to rest upon the upper and lower seats when the cap is in its closed position. The lower valve assembly can be actuated to vent radiator pressure to the overflow vent before the upper valve is raised off its seat.

A radially slidable pawl at the top of the cap has a depending toe which fits within one of the filler neck recesses to keep the cap from being unscrewed. In addition, a lever assembly is provided which will slide the pawl in and release the cap for removal. However, the lever assembly is coupled to the lower valve assembly so that it cannot be operated to move the release pawl without also venting the radiator.

With this arrangement it is not possible for a person to remove the radiator cap of the present invention without first venting radiator pressure through the radiator overflow pipe. Moreover, the sliding pawl and lever mechanisms do not present any projecting tabs, locking fingers or the like to catch and tear clothing or lacerate a person's hands. Instead, the tabs and locking fingers are carried by the generally concealed sliding pawl. The cap is relatively inexpensive, reliable in operation, and easily operated.

Other objects and features of the invention will become apparent from consideration of the following description taken in connection with the accompanying drawings.

BRIEF DESCRIPTION OF THE DRAWINGS

FIG. 1 is a longitudinal sectional view of a pressure relief radiator cap according to the present invention; the cap being illustrated in its sealing position upon the usual radiator filler neck;

FIG. 2 is a view similar to FIG. 1, but illustrating the orientation of the cap components to vent the radiator and enable removal of the cap;

FIG. 3 is a perspective view, partially cut away, illustrating the lock positions of the sliding pawl and lever assembly;

FIG. 4 is a detail, transverse cross-sectional view of portions of the sliding pawl, cap cover portion, and lever assembly;

FIG. 5 is a view taken along the line 5—5 of FIG. 1; and

FIG. 6 is a detail sectional view illustrating an alternative cap embodiment employing a resiliently flexible release pawl.

DESCRIPTION OF THE PREFERRED EMBODIMENTS

Referring now to the drawings, and particularly to FIGS. 1-5, there is illustrated a pressure relief radiator cap 10 comprising, generally, a frame or body assembly 12 including a cap portion 14; an upper valve or flexible diaphragm 16 carried by the body assembly 12; a lower valve assembly 18 also carried by the body assembly 12; a release valve assembly 20 operable to vent pressure from the radiator, as will be seen; an interlock pawl 22 operative to lock and release the cap 10; and a release lever 24 manually pivotable upwardly to contemporaneously actuate the release valve assembly 20 and the interlock pawl 22 so that radiator pressure is vented prior to release of the cap 10 for removal from the radiator.

The radiator cap 10 is adapted for association with the usual automobile radiator filler neck 26 which includes an internal annular lower seat 28 defined by a reduction in the filler neck cross-section. The filler neck 26 also includes an upper seat 30 defined by a radially extending, peripheral flange 32 terminating in a downwardly formed skirt which is notched or cut away to provide a pair of radially outwardly opening, diametrically opposed recesses 34.

The filler neck 26 also includes an overflow outlet or vent 36 located between the seats 28 and 30 and is connected to an overflow pipe 38 to allow venting of boil-off water and steam from the radiator. Venting through vent 36 occurs upon unseating of the release valve assembly 20 with the diaphragm 16 in sealing position upon the upper seat 30.

The cap portion 14 overlies the upper seat 30 and includes a downturned circumferential skirt or flange 40 which is turned in at two places to provide integral, radially inwardly directed, and diametrically opposed locking finger 42 adapted to drop through the complemental filler neck recesses 34 when the cap 10 is placed over the filler neck 26.

The usual filler neck flange 32 is cammed so that as the cap 10 is rotated upon the filler neck, in a clockwise direction, the engagement of the locking fingers 42 upon the lower edge of the neck flange 32 draws the cap 10 down tightly upon the neck. This effects a close, sealing engagement of the perimeter of the flexible diaphragm 16 upon the upper seat 30, and a corresponding close, sealing engagement of the valve assembly 18 upon the lower seat 28.

The valve assembly 18 comprises a dome shaped retainer 44 having a central opening which is loosely sleeved upon the vertically oriented shank of a sleeve 46, which also forms part of the assembly 18. A lower flange 48 of the sleeve 46 underlies the margins of the carrier central opening to support the carrier 44 in position.

The upper extremity of the sleeve 46 includes a shoulder which underlies the margins defining central openings in the diaphragm 16 and the cap portion 14. The upper end of the sleeve 46 is headed over to fix the diaphragm 16 and cap portion 14 in position.

A compression spring 50 is disposed about the sleeve 46 between the diaphragm 16 and the retainer 44 and is operative to resiliently bias the retainer 44 downwardly. A circular valve carrier 52 supporting a gasket 54 on its underside is engaged by the retainer 44 and is thereby also urged downwardly. Both the carrier 52 and the gasket 54 are centrally apertured to fixedly receive a vertically oriented sleeve 56 whose central bore defines a relief opening 58.

The release valve assembly 20 includes a vacuum relief valve 60 located below the gasket 54. A central, vertically oriented lower stem 62 of the valve 60 projects upwardly through the relief opening 58 and through the central opening of a transversely oriented resilient band element 64 having feet which rest against the upper surface of the valve carrier 52. The margins of the element central opening engage the underside of a flattened head 66 of the stem 62 so that the bias of the element 64 normally urges the relief valve 60 into sealing relation with the underside of the gasket 54 to seal off the relief opening 58. The bias of the element 64 is sufficiently light that it will yield to a slight pressure differential and relieve any vacuum which may develop in the radiator.

The valve carrier 52 includes an upwardly turned skirt 68 which is inwardly bent or deformed at various spaced points about its periphery to overlie the outer periphery of the retainer 44 to loosely support the retainer and prevent it from dropping off when the cap 10 is removed from the filler neck 26. The loose support allows limited relative movement between the carrier 52 and retainer 44, which is desirable to enable the gasket 54 to accommodate itself to slight discrepancies in the dimensions of various radiator filler necks.

A vertically elongated rod comprising an upper stem 70, which is an upper, structurally discontinuous extension of the lower stem 62, is disposed for vertical movement within the hollow interior of the sleeve 46. The lower end of the stem 70 rests against the lower stem 62, while the upper end is provided with a flat head 72 projecting above the sleeve 46. A conical coil compression spring 74 is disposed about the stem 70 and beneath the head 72. The spring 74 rests upon the upper surface of a relatively deep central depression 76 formed in the cap portion 14, the coils of the spring 74 being adapted to collapse within one another to rest flat within the depression 76 in the completely collapsed state of the spring.

A resilient, disc-shaped booster or seal 78 is disposed about the upper extremity of the upper stem 70 between the spring 74 and the base of the depression 76 to seal off the bore of the sleeve 46 and prevent scalding water or steam from escaping during venting of the radiator through the relief opening 58. The seal 78 also acts as a booster spring to aid the spring 74 in biasing the stem 70 upwardly.

Depression of the stem assembly, which includes both the lower and upper stems 62 and 70, urges the relief valve 60 downwardly to uncover the relief opening 58. This allows steam in the radiator to escape along the path of the arrows 80, around the relief valve 60, through the opening 58, about the element 64, through the clearance space between the sleeve 46 and the retainer 44, and finally through the vent 36 to the overflow pipe 38. As will be seen, such depression of the stem assembly is the function of release lever 24.

Radially outwardly of the deep central depression 76, the cap portion 14 includes a shallower depression which defines a pawl space 84. This space is covered by a cover 82 whose periphery is secured to the perimeter of the cap portion 14 by a plurality of usual rivets 86.

As best seen in FIGS. 3 and 5, the interlock pawl 22 is radially slidably disposed within the pawl space 84. The pawl 22 is generally C-shaped in configuration and includes an outer portion which extends radially outwardly and terminates in a downturned tab or depending toe 88 which projects through a slot 90 provided in the periphery of the cap portion 14. The slot 90 is adapted for vertical registry with one of the filler neck recesses 34 when the radiator cap 10 is located in its sealing position, as illustrated in FIGS. 1 and 2. The slot 90 is radially elongated to allow the toe 88 to move into and out of registry with the associated filler neck recess 34 upon radial slidable movement of the pawl 22.

The centrally cut away portion of the C-shape pawl 22 defines a pair of spaced apart, inwardly projecting arms 92 located on opposite sides of the upper stem head 72 in vertically spaced relation with the spring 74. The arms 92 include inwardly projecting tabs or extensions 94 which are loosely received within a pair of slots 96 provided in opposed, vertically oriented and parallel side walls 98 which form a part of the channel shaped release lever 24. The action of the extensions 94 within the slots 96 constitutes a coupling means effective to radially outwardly slide the interlock pawl 22 upon upward pivotal movement of the release lever 24 about a horizontal axis 100.

More particularly, the release lever 24 extends generally radially outwardly of the center of the cap portion 14 and includes a free end or tab 102 which can be grasped to pivot the lever 24 upwardly. The inner extremities of the lever side walls 98 include oversize openings which loosely receive a pivot pin 104, which is also disposed through similar oversize openings in the laterally spaced apart walls 106 of an actuator 108. The base of the actuator 108 comprises a lower camming surface 110, which is in engagement with the upper stem head 66. The inner end of the actuator 108 includes a diagonal or inwardly and upwardly inclined forward wall which constitutes an upper camming surface 112. The upper free end of the forward wall defining the surface 112 includes a projection or tab 114 which fits within a complemental notch in the forward end of the lever main body to aid in properly orienting the parts with respect to one another and to cause them to pivot in common.

The ends of the pin 104 extend through and are supported within openings which are formed in a pair of laterally spaced apart ears or trunnions 116 integrally formed out of the material of the cover 82.

In operation, the radiator cap 10 is mounted upon the filler neck 26 by placing the locking fingers 42 in registry with the filler neck recess 34 until the cap 10 drops down in position for the fingers 42 to ride upon the undersurface of the filler neck flange 32. In the embodiment of FIGS. 1–5, the lever 24 is at this time in its upwardly pivoted position, as seen in FIG. 2.

The cap 10 is rotated clockwise until the locking fingers 42 abut the usual filler neck stops 118, as best illustrated in FIG. 5. In this position of the cap 10 the valve assembly 18 will be seated upon the lower seat 28 and the diaphragm 76 will be seated upon the upper seat 30. In addition, the bias of the resilient element 64 now maintains the relief valve 60 in seated position overlying and sealing off the relief opening 58.

Assuming now that the radiator coolant is to be inspected, the gasoline station attendant, for example, grasps the free end or tab 102 of the lever 24 and pivots it from the position of FIG. 1 to the position of FIG. 2. This moves the camming surface 110 out of engagement with the stem head 72, and brings the camming surface 112 into engagement with the head 72. The surface 112 is located at a greater distance from the pivot axis 100, as compared to the camming surface 110, so that the upward pivotal movement of the lever 24 causes the actuator or stems 62 and 70 to move downwardly to effect unseating of the relief valve 60. Pressure in the radiator then escapes along the path indicated by the arrows 80, while the still seated diaphragm 16 prevents pressure from escaping from the top of the filler neck 26.

Referring to FIG. 1, until the lever 24 is pivoted upwardly, the cap 10 cannot be rotated for removal, since the depending toe 88 of the interlock pawl 22 is in interfering relation with the associated filler neck recess 34. When the lever 24 is pivoted upwardly, the pawl 22 is moved outwardly, disengaging the toe 88 from the associated recess 34, and freeing the cover 24 for rotation. Thus, it is not possible to remove the cap 10 without automatically first releasing or venting the radiator pressure.

The embodiment of FIGS. 1–5 requires that the lever 24 be in the upwardly pivoted position of FIG. 2 in order to mount the cap 10 upon the filler neck 26. Otherwise, the depending toe 28 would contact the upper surface of the filler neck flange and prevent the cover from dropping into position.

In FIG. 6 a second cap embodiment is illustrated in which the cover 82 is replaced by a cover 82a having an upwardly deformed portion defining a deflection cavity 120. Also, the interlock pawl 22 of the first embodiment is replaced by a pawl 22a made of resilient material, such as spring steel, to allow it to flex upwardly into the cavity 120. With this arrangement, the cap can be placed over the filler neck 26 with the lever 24 in its downwardly pivoted position. The depending toe 88 will simply deflect upwardly, ride upon the flange as the cap 10 is rotated in a clockwise direction, and then drop down into the association filler neck recess 34 when it comes into vertical registry.

Various modifications and changes may be made with regard to the foregoing detailed description without departing from the spirit of the invention.

I claim:

1. A pressure relief radiator cap for use with an automobile radiator filler neck having an internal lower seat, an upper seat, an overflow vent between said upper and lower seats, and a circular flange at the top having a pair of radially outwardly opening, diametrically opposed recesses, said radiator cap comprising:
    body means including a cap portion adapted to overlie said filler neck top and having a pair of depending, diametrically opposed locking fingers adapted to drop through said recesses upon registry therewith in an open position of said cap relative to said filler neck, said locking fingers further being adapted upon turning of said cap portion to ride upon said flange and out of said registry to locate said cap in a sealing position relative to said filler neck;
    upper valve means carried by said body means and adapted to rest upon said upper seat in sealing relation when said cap is in said sealing position;
    lower valve means carried by said body means and adapted to rest upon said lower seat in sealing relation when said cap is in said sealing position, said lower valve means including a release opening;
    release valve means normally closing said release opening and including an actuating portion extending upwardly through said upper valve means, said actuating portion being downwardly movable to actuate said release means to uncover said release opening to release radiator pressure therethrough for venting through said overflow vent;
    an interlock pawl carried by said cap portion for radial slidable movement between a lock position and a release position, said pawl including a depending toe receivable in one of said filler neck flange recesses in said sealing position of said cap to constrain said cap portion against rotation toward said open position; and
    a release lever carried by said body means for pivotal movement about a horizontal axis, said lever being engageable with said actuating portion for depression thereof upon upward pivotal movement of said lever, said lever further being engageable with said interlock pawl for slidable movement thereof to said release position upon upward pivotal movement of said lever whereby radiator pressure is vented prior to rotation of said cap to said open position.

2. A pressure relief radiator cap according to claim 1 wherein said cap portion includes trunnion means rotatably supporting said release lever.

3. A pressure relief radiator cap according to claim 1 wherein said lever includes a camming portion slidably engaged upon the upper extremity of said actuator portion, said camming portion having camming surfaces located at different distances from said horizontal axis of pivotal movement of said lever for moving said actuator portion downwardly upon said upward pivotal movement of said lever.

4. A pressure relief radiator cap according to claim 1 wherein at least that portion of said interlock pawl supporting said depending toe is resiliently flexible whereby said cap portion may be located in said open position even when said interlock pawl is in said lock position and said depending toe is out of registry with said filler neck recesses.

5. A pressure relief radiator cap for use with an automobile radiator filler neck having an internal lower seat, an upper seat, an overflow vent between said upper and lower seats, and a circular flange at the top having a pair of radially outwardly openings, diametrically opposed recesses, said radiator cap comprising:

a circular cap portion adapted to overlie said filler neck top and having a radial slot, a depressed, centrally apertured central portion and a pair of depending, diametrically opposed locking fingers adapted to drop through said recesses upon registry therewith in an open position of said cap relative to said filler neck, said locking fingers further being adapted upon turning of said cap portion to ride upon said flange and out of said registry to locate said cap in a sealing position relative to said filler neck;

a vertically oriented sleeve carried by said cap portion;

a circular diaphragm carried by said sleeve below said cap portion and adapted to rest upon said upper seat in sealing relation when said cap is in said sealing position;

valve means carried by said sleeve and adapted to rest upon said lower seat in sealing relation when said cap is in said sealing position, said valve means including a release opening;

a release valve normally closing said release opening and including a vertically elongated actuating stem means having a lower stem extending through said release opening, and an upper stem extending through said sleeve, said diaphragm and said cap portion, said actuating stem means being downwardly movable to actuate said release valve to uncover said release opening to release radiator pressure therethrough for venting through said overflow vent;

a cover carried by said cap portion in overlying relation to said depressed central portion to define a pawl space, and including trunnion means;

an interlock pawl radially slidable in said pawl space between a lock position and a release position, said pawl including a depending toe extending through said cap portion slot and receivable in one of said filler neck flange recesses in said sealing position of said cap to constrain said cap portion against rotation toward said open position; and a release lever carried by said trunnion means for pivotal movement about a horizontal axis, said lever having a first camming surface normally engaged upon the upper extremity of said upper stem, said lever further having a second camming surface engageable with said upper extremity of said upper stem upon upward pivotal movement of said lever to depress said stem means, said lever further having coupling means engageable with said interlock pawl to slidably move said pawl to said release position upon said upward movement of said lever whereby said release opening is uncovered contemporaneously with movement of said interlock pawl enabling rotation of said cap portion toward said release position.

6. A pressure relief radiator cap according to claim 5 wherein at least that portion of said interlock pawl supporting said depending toe is resiliently flexible whereby said cap portion may be located in said open position even when said interlock pawl is in said lock position and said depending toe is out of registry with said filler neck recesses.

7. A pressure relief radiator cap according to claim 5 wherein said upper and lower stems are structurally discontinuous relative to one another.

8. A pressure relief radiator cap according to claim 5 wherein said release lever includes a camming element having opposite walls carried by said trunnion means, a base portion defining said first camming surface, and an inclined front wall defining said second camming surface.

9. A pressure relief radiator cap according to claim 5 wherein said lever includes spaced side walls pivotable upon said trunnion means, wherein said interlock pawl is formed to define laterally spaced extensions adjacent said side walls, respectively, and said lever side walls include slots which receive said extensions and which comprise said coupling means for engaging and radially slidably moving said pawl upon pivotal movement of said lever about said horizontal axis.

* * * * *

Disclaimer 3,830,398.—*Donald J. Shanklin*, Granada Hills, Calif. PRESSURE RELIEF RADIATOR CAP. Patent dated Aug. 20, 1974. Disclaimer filed Mar. 29, 1989, by the assignee, Mr. Gasket Co.

Hereby enters this disclaimer to the entire term of said patent.

[*Official Gazette May 23, 1989*]